(12) United States Patent
Kuwada et al.

(10) Patent No.: US 11,017,564 B2
(45) Date of Patent: May 25, 2021

(54) IMAGE PROCESSING APPARATUS AND NON-TRANSITORY COMPUTER READABLE MEDIUM STORING IMAGE PROCESSING PROGRAM

(71) Applicant: FUJI XEROX CO., LTD., Tokyo (JP)

(72) Inventors: Yoshitaka Kuwada, Kanagawa (JP); Jungo Harigai, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 16/731,054

(22) Filed: Dec. 31, 2019

(65) Prior Publication Data
US 2020/0342629 A1    Oct. 29, 2020

(30) Foreign Application Priority Data
Apr. 24, 2019  (JP) .............................. JP2019-083183

(51) Int. Cl.
  *G06T 7/90*    (2017.01)
  *G06T 11/60*   (2006.01)
  *G06T 11/00*   (2006.01)
  *G06T 7/44*    (2017.01)

(52) U.S. Cl.
  CPC .................. *G06T 7/90* (2017.01); *G06T 7/44* (2017.01); *G06T 11/001* (2013.01); *G06T 11/60* (2013.01)

(58) Field of Classification Search
  CPC ...................................... G06T 7/90
  USPC ................................................... 382/108
  See application file for complete search history.

(56) References Cited

U.S. PATENT DOCUMENTS

| | | | |
|---|---|---|---|
| 10,269,173 B2 | 4/2019 | Ide | |
| 2005/0073939 A1 | 4/2005 | Sakaguchi et al. | |
| 2011/0274351 A1* | 11/2011 | Tsukada | H04N 1/628 382/167 |
| 2013/0301908 A1* | 11/2013 | Shim | G06T 5/005 382/154 |
| 2014/0092227 A1* | 4/2014 | Kanamori | H04N 9/04557 348/68 |
| 2015/0253487 A1* | 9/2015 | Nichol | G02B 6/0036 362/610 |
| 2018/0152649 A1* | 5/2018 | Kusumi | H04N 5/357 |
| 2019/0109986 A1* | 4/2019 | Kusumi | H04N 5/232 |
| 2019/0266788 A1* | 8/2019 | Huynh-Thu | G06F 30/23 |

FOREIGN PATENT DOCUMENTS

| | | |
|---|---|---|
| JP | 2005115645 | 4/2005 |
| JP | 2015049691 | 3/2015 |
| JP | 2018189223 | 11/2018 |

* cited by examiner

*Primary Examiner* — David T Welch
(74) *Attorney, Agent, or Firm* — JCIPRNET

(57) ABSTRACT

An image processing apparatus includes an acquisition unit that acquires a diffuse reflection image of an object surface and a specular reflection image of the object surface, and a reproduction unit that reproduces the object surface such that illumination color is darker as saturation of the diffuse reflection image or a value representing the saturation is higher than of the specular reflection image, by using the diffuse reflection image and the specular reflection image.

20 Claims, 11 Drawing Sheets

DIFFUSE REFLECTION IMAGE
SPECULAR REFLECTION IMAGE

IMAGE PROCESSING APPARATUS AND NON-TRANSITORY COMPUTER READABLE MEDIUM STORING IMAGE PROCESSING PROGRAM

CROSS-REFERENCE TO RELATED APPLICATIONS

This application is based on and claims priority under 35 USC 119 from Japanese Patent Application No. 2019-083183 filed Apr. 24, 2019.

BACKGROUND

(i) Technical Field

The present invention relates to an image processing apparatus and a non-transitory computer readable medium storing an image processing program.

(ii) Related Art

A technique using a bidirectional reflectance distribution function (hereinafter referred to as BRDF) as a model in order to reproduce the texture (such as glossiness or unevenness) of an object surface has been known.

JP2015-049691A describes a method for acquiring a BRDF and estimating a model coefficient to be fitted to the acquired BRDF by a least square method or the like as a method for determining a BRDF model coefficient.

Further, JP2005-115645A describes a method for emitting light from a large number of angles, capturing an image with a camera from a large number of angles, preparing a conversion table between the luminance of the captured image and the emission angle or the imaging angle, and calculating the luminance of the target position by performing conversion table interpolation processing.

SUMMARY

In the techniques of acquiring BRDF, it takes time to acquire data because the reflectance distribution is measured by changing the incident angle and the light receiving angle. In addition, in the technique for estimating the BRDF using a large number of image data by entering light from a large number of angles and capturing an image with a camera from a large number of angles, it takes an enormous amount of time to acquire the image data, and in order to obtain accurate gloss information, there is image data captured from a number of angles, and a large amount of calculation is required. Aspects of non-limiting embodiments of the present disclosure relate to an image processing apparatus and a non-transitory computer readable medium storing an image processing program capable of expressing the texture of an object surface with less image data and calculation than the case of expressing the texture of an object surface using a large number of image data obtained by capturing an image with a camera from a large number of angles.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an image processing apparatus including an acquisition unit that acquires a diffuse reflection image of an object surface and a specular reflection image of the object surface; and a reproduction unit that reproduces the object surface such that illumination color is darker as saturation of the diffuse reflection image or a value representing the saturation is higher than of the specular reflection image, by using the diffuse reflection image and the specular reflection image.

BRIEF DESCRIPTION OF THE DRAWINGS

Exemplary embodiment(s) of the present invention will be described in detail based on the following figures, wherein.

DETAILED DESCRIPTION

Figure 1:
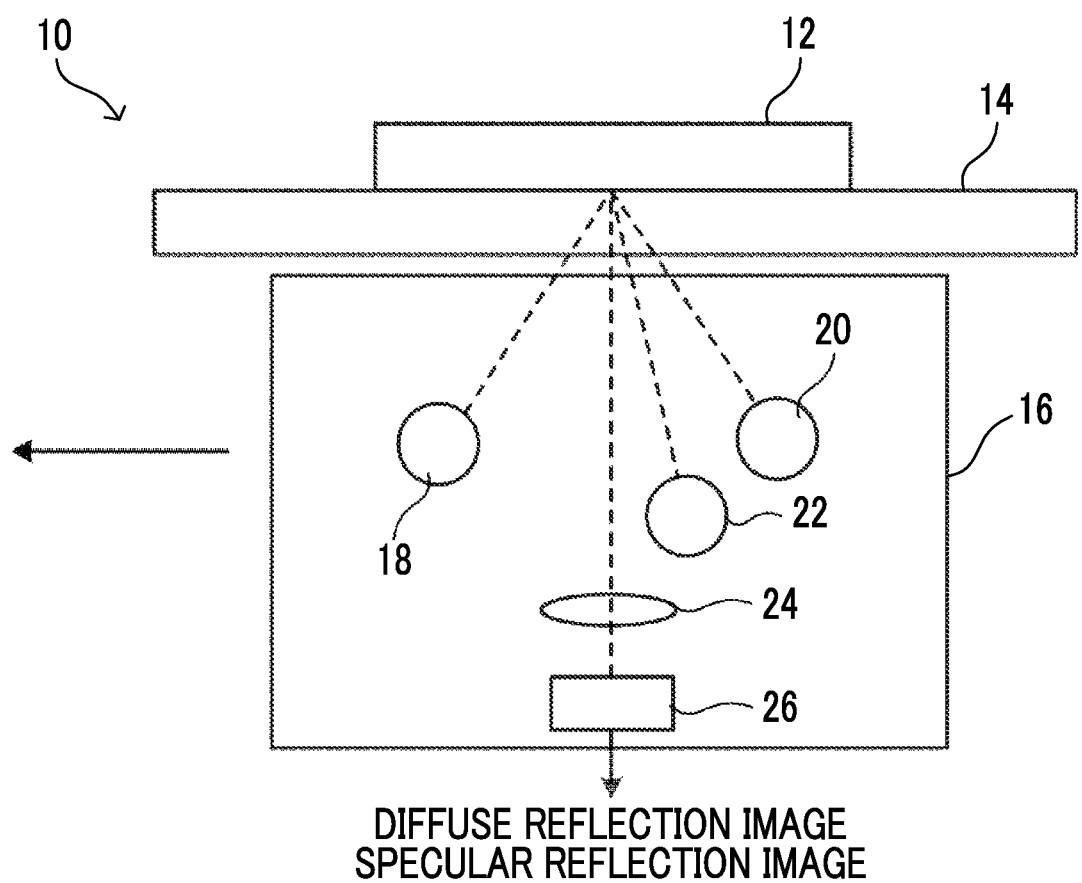
FIG. 1 is a diagram illustrating a schematic configuration of a texture reading device.

Hereinafter, exemplary embodiments will be described in detail with reference to the accompanying drawings. FIG. 1 is a diagram illustrating a schematic configuration of a texture reading device.

The texture reading device 10 optically reads the surface characteristics of the object 12 and generates image information representing the reading result. Although the object 12 is described as a planar object in the present exemplary embodiment, it is not limited to a plane. The image information generated by the texture reading device 10 includes image information based on diffuse reflection light and image information based on specular reflection light. The texture reading device 10 includes a platen glass 14, a carriage 16, light sources 18, 20, and 22, an imaging optical system 24, and a sensor 26. In the present exemplary embodiment, an example in which the texture reading device 10 reads the planar object 12 as an example is described, but the texture reading device 10 may read a three-dimensional object.

In the texture reading device 10, the components shown in FIG. 1 are disposed with a predetermined width in a direction perpendicular to the paper surface. This direction is the main-scanning direction of the texture reading device 10, and the direction indicated by the arrow in FIG. 1 is the sub-scanning direction of the texture reading device 10.

The platen glass 14 is composed of a transparent glass plate that supports the object 12 to be read. The platen glass 14 is not limited to a glass plate, but may be an acrylic plate, for example. Although not shown, a platen cover which covers the platen glass 14 so as to block external light and sandwiches the object 12 may be provided.

The carriage 16 moves in the sub-scanning direction at a predetermined speed in a case of reading the object 12. The carriage 16 includes light sources 18, 20, and 22 inside. The light source 18 emits light for reading diffuse reflection light from the object 12 by irradiating the object 12 with light at an incident angle of 45° from the front side in the moving direction of the carriage 16 with respect to the normal direction of the object 12. The light source 20 emits light for reading diffuse reflection light from the object 12 by irradiating the object 12 with light at an incident angle of 45° from the rear side in the moving direction of the carriage 16 with respect to the normal direction of the object 12. On the other hand, the light source 22 emits light for reading specular reflection light from the object 12 by irradiating the object 12 with light at an incident angle of 10° with respect to the normal direction of the object 12.

The light source 22 is provided at a position that does not block the principal ray of the reflected light. The incident angle of light emitted from the light source 22 is 10° in the exemplary embodiment, but is not limited to 10°, and may be, for example, about 5° to 10°. The reflection light of the light emitted from the light source 22 which travels in the normal direction of the object 12 is read.

The light source 22 has a narrow angle of light to be emitted. In a case where the angle of light emitted from the light source 22 is relatively large, a cover or the like for limiting the angle of light emitted from the light source 22 may be provided. Further, since the light source 22 is for reading gloss information of the object 12, for example, it is desirable that the luminance in the main-scanning direction be as uniform and continuous as possible, compared with the light sources 18, 20.

As an example of the light source 22, white light such as a fluorescent lamp or a rare gas fluorescent lamp (such as a xenon fluorescent lamp) is applied. Further, the light source 22 may be formed in which a plurality of white LEDs are arranged in the main-scanning direction and the luminance distribution in the main-scanning direction is made uniform using a diffusion plate or the like.

The carriage 16 further includes an imaging optical system 24 and a sensor 26 inside. The imaging optical system 24 includes a reflection mirror and an imaging lens, and causes the sensor 26 to form an image of diffuse reflection light and specular reflection light from the object 12. The sensor 26 receives the diffuse reflection light and the specular reflection light imaged by the imaging optical system 24 and generates an image signal corresponding to the received light. The sensor 26 is composed of a light receiving element such as a charge coupled device (CCD) linear image sensor or a complementary metal oxide semiconductor (CMOS) image sensor, and converts the received light into a signal representing the intensity thereof. The sensor 26 includes a color filter, and generates image information representing the color of the object 12. The sensor 26 outputs diffuse reflection image information obtained by receiving diffuse reflection light and specular reflection image information obtained by receiving specular reflection light to an external device or the like.

A normal image reading device is configured to read diffuse reflection light from the object 12 by emitting light from the light source 18 or 20 at an incident angle of 45° with respect to the normal direction of the object 12. On the other hand, in addition to this, the texture reading device 10 of the present exemplary embodiment is configured to read specular reflection light from the object 12 by emitting light from the light source 22 at an incident angle of 10° with respect to the normal direction of the object 12.

In the texture reading device 10 shown in FIG. 1, the incident angle and the light receiving angle are constant in each pixel on a two-dimensional plane. Therefore, by calculating the difference between an image acquired at a light source incident angle of 45°, which is a diffuse reflection condition, and an image acquired at a light source incident angle of 10°, which is a specular reflection condition, the metal gloss information is accurately extracted. That is, specular reflectance of each of an area with metal gloss and the two-dimensional plane is acquired at a time by simple difference calculation. Note that for the diffuse reflection condition and the specular reflection condition, calibration is performed with the identical white calibration plate, so gloss information is extracted by a simple difference calculation.

First Exemplary Embodiment

Figure 2:
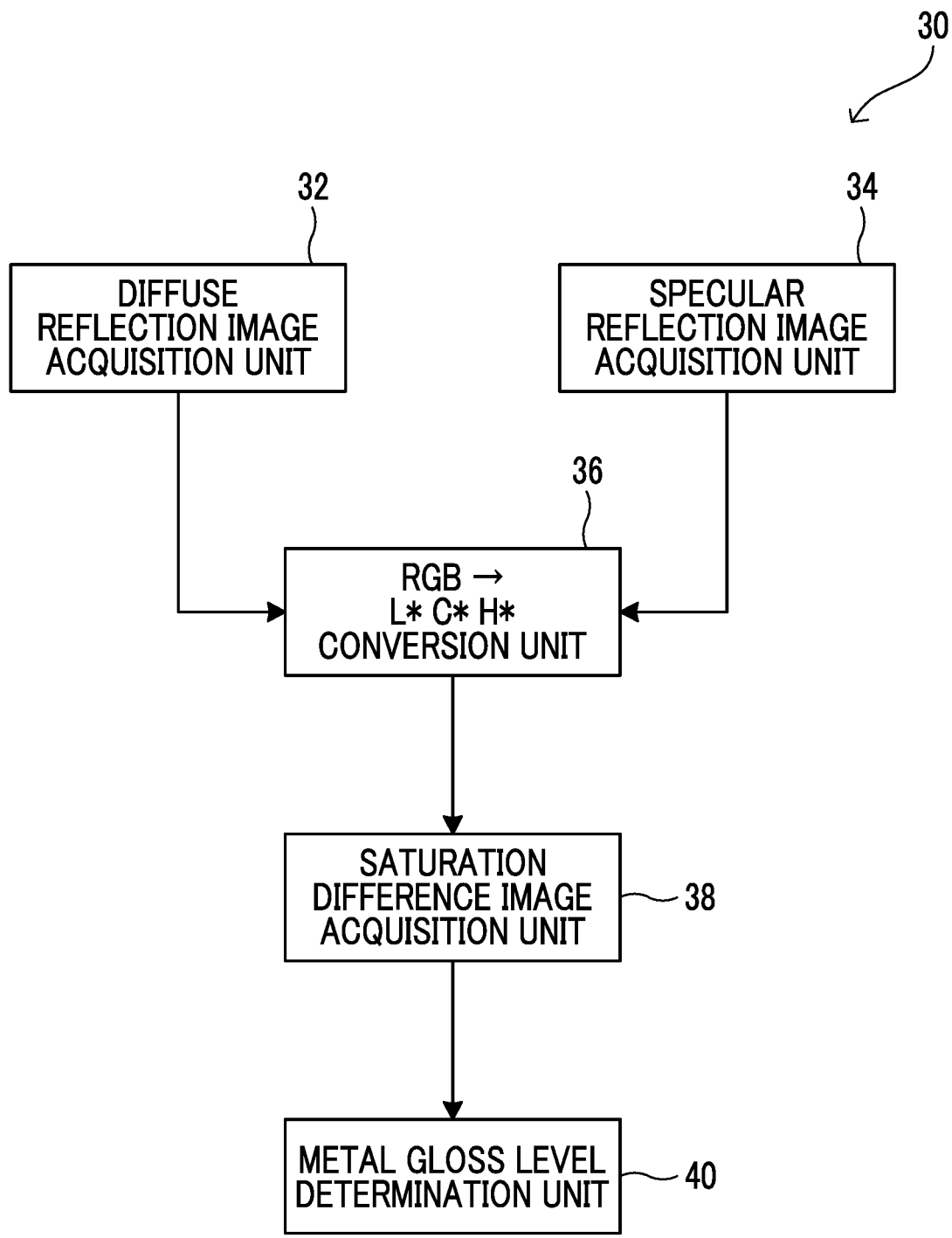
FIG. 2 is a block diagram illustrating a configuration of an image processing apparatus according to a first exemplary embodiment.

Subsequently, an image processing apparatus according to the present exemplary embodiment will be described. FIG. 2 is a block diagram illustrating a configuration of the image processing apparatus according to the present exemplary embodiment.

An image processing apparatus 30 according to the present exemplary embodiment acquires and processes the diffuse reflection image and the specular reflection image obtained by the texture reading device 10 shown in FIG. 1, and outputs information representing the metal gloss level of the surface of the object 12. In the present exemplary embodiment, an example will be described in which the diffuse reflection image is subtracted from the specular reflection image as the difference calculation. In a case where the difference value of red (R), green (G), and blue (B) or the difference value of L* (lightness) is positive (greater than 0), it is determined that the object surface is glossy, and among the object surfaces determined to be glossy, the metal gloss level is determined. The block diagrams and flowcharts described below are based on the precondition that the object surface is determined to be glossy.

Here, the gloss of the object surface includes a metal gloss in which the specular reflection is colored and a non-metal gloss in which the specular reflection is not colored. The observed glossiness differs between metal gloss and non-metal gloss such as resin other than metal. Specifically, in the case of metal, in a case where illumination light is emitted, light in which the color of the illumination light is changed according to the color of the metal or the color of the layer including the metal present on the metal surface is observed. On the other hand, in the case of a non-metal, in a case where the illumination light is irradiated, the color of the illumination light is observed. The metal gloss level represents how much the metal gloss is, and the image processing apparatus 30 according to the present exemplary embodiment derives the metal gloss level.

The image processing apparatus 30 includes functions of a diffuse reflection image acquisition unit 32, a specular reflection image acquisition unit 34, an RGB→L* C* H* conversion unit 36, a saturation difference image acquisition unit 38, and a metal gloss level determination unit 40. The image processing apparatus 30 includes a computer in which a central processing unit (CPU), a read only memory (ROM), a random access memory (RAM), and the like are connected through a bus so as to communicate with each other. The CPU is a central processing unit, and executes various programs or controls each unit. That is, the CPU reads a program from the ROM, and executes the program using the RAM as a work area. The CPU controls the above-described components and performs various arithmetic processes in accordance with the program stored in the ROM. In the present exemplary embodiment, the ROM stores a program for executing the above-described respective functions. The diffuse reflection image acquisition unit 32 and the specular reflection image acquisition unit 34 correspond to the acquisition unit. The RGB→L* C* H* conversion unit 36, the saturation difference image acquisition unit 38, and the metal gloss level determination unit 40 correspond to the output unit.

The diffuse reflection image acquisition unit 32 and the specular reflection image acquisition unit 34 acquire the diffuse reflection image and the specular reflection image obtained by the texture reading device 10, respectively. The diffuse reflection image acquisition unit 32 and the specular reflection image acquisition unit 34 may be connected to the texture reading device 10, respectively, and acquire these images from the texture reading device 10. Alternatively, these images may be acquired through a server or the like connected to the texture reading device 10 through a network.

The RGB→L* C* H* conversion unit 36 converts the diffuse reflection image acquired by the diffuse reflection image acquisition unit 32 and the specular reflection image acquired by the specular reflection image acquisition unit 34 from image data of the color components of red (R), green (G), and blue (B) into image data of the color components of L* (lightness), C* (saturation), and H* (hue angle). Note that the conversion method varies by applying a known color conversion technique, and thus detailed description thereof is omitted.

The saturation difference image acquisition unit 38 acquires a saturation difference image, by using the image data of each of the diffuse reflection image and the specular reflection image converted by the RGB→L* C* H* conversion unit 36. That is, a saturation difference image is acquired by obtaining a difference image of the C* color component. To obtain a saturation difference image, there are a case where a diffuse reflection image is subtracted from a specular reflection image and a case where a specular reflection image is subtracted from a diffuse reflection image, and either one may be used, but in the present exemplary embodiment, an example in which a diffuse reflection image is subtracted from a specular reflection image will be described.

The metal gloss level determination unit 40 determines the metal gloss level using the saturation difference image acquired by the saturation difference image acquisition unit 38 and outputs the determination result. In the present exemplary embodiment, the magnitude of the saturation difference is output as object surface information representing the metal gloss level. Further, the metal gloss level determination unit 40 determines as metal gloss in a case where the saturation difference is positive (in a case where the specular reflection image is larger than the diffuse reflection image), and determines as non-metal gloss in a case where the saturation difference is 0, or is negative.

Figure 3:
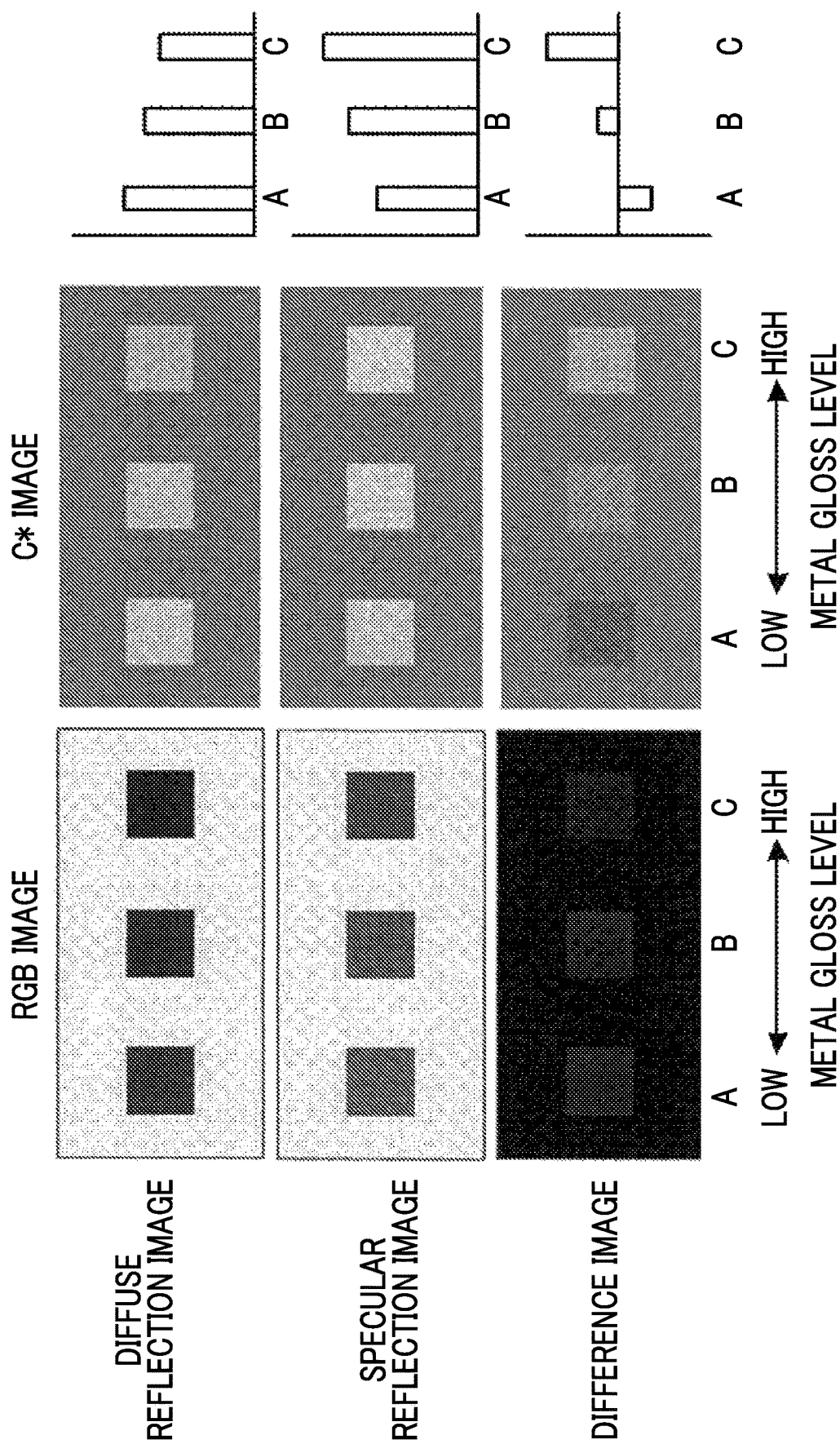
FIG. 3 is a diagram for explaining an example of determination of a metal gloss level by a metal gloss level determination unit in the first exemplary embodiment.

FIG. 3 is a diagram for explaining an example of determination of a metal gloss level by the metal gloss level determination unit 40 according to the present exemplary embodiment. In FIG. 3, three types A to C as metal gloss levels are compared and shown. Note that the diffuse reflection images and specular reflection images of A to C are magenta color images.

In the difference image between the diffuse reflection image and the specular reflection image, in the RGB image, the lower the metal gloss level is, the darker the complementary green color is. In addition, in the C* (saturation) image, the saturation difference image increases as the metal gloss level increases. Therefore, the metal gloss level determination unit 40 determines the metal gloss level using the magnitude of the saturation difference as the metal gloss level. Note that the metal gloss level determination unit 40 may determine whether or not there is metal gloss level by binarizing the saturation difference image with any set value. For example, in the following description, as an example, in a case where the saturation difference (specular reflection image-diffuse reflection image) in FIG. 3 is positive, it is determined that there is metal gloss, and in a case of negative, it is determined that there is no metal gloss. In a case where the saturation difference (diffuse reflection image-specular reflection image) is negative, it is determined that there is metal gloss, and in a case of positive, it is determined that there is no metal gloss.

Figure 4:
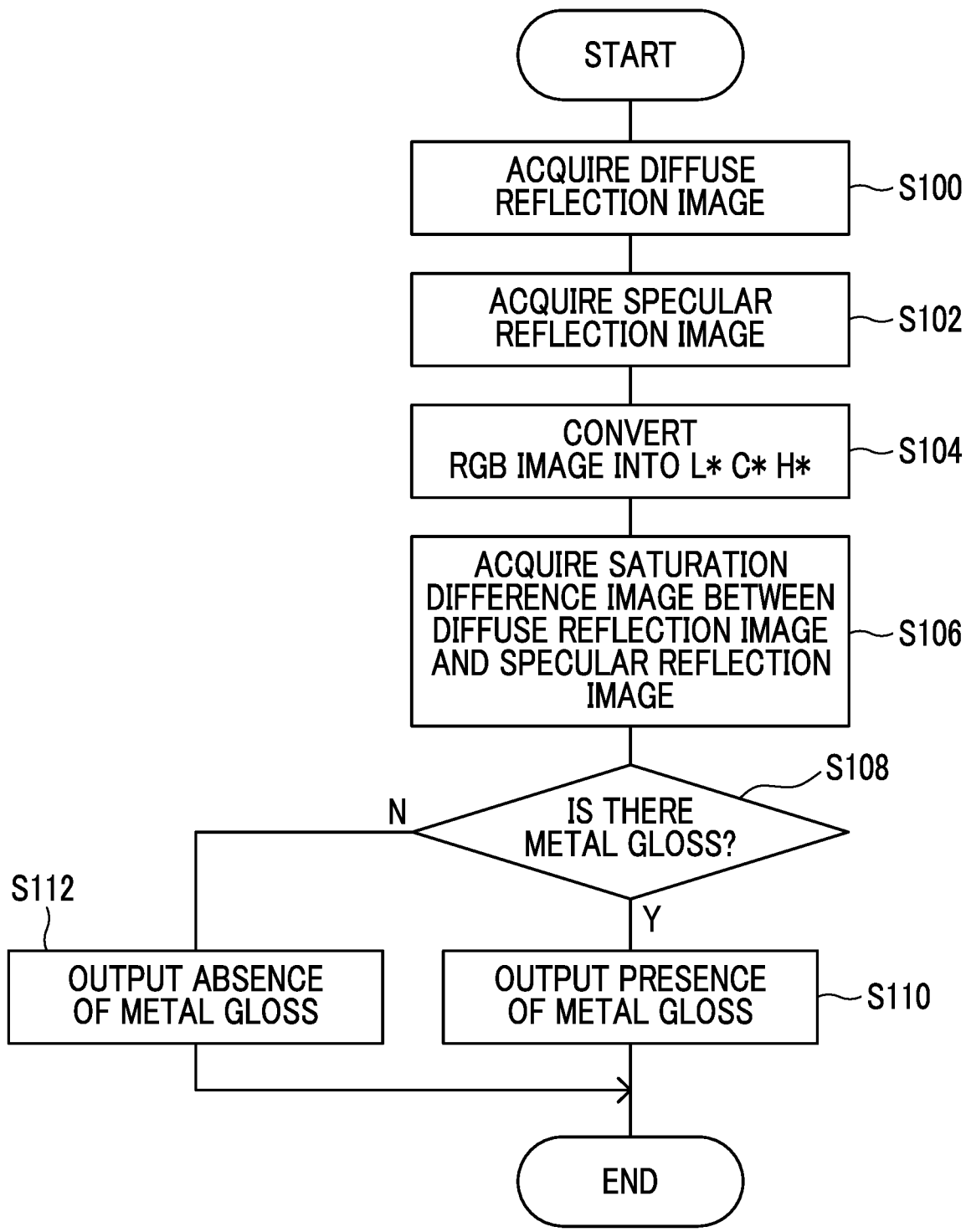
FIG. 4 is a flowchart illustrating an example of a flow of a process performed by the image processing apparatus according to the first exemplary embodiment.

Next, specific processing performed by the image processing apparatus 30 according to the present exemplary embodiment configured as described above will be described. FIG. 4 is a flowchart illustrating an example of a flow of a process performed by the image processing apparatus 30 according to the present exemplary embodiment.

In step S100, the diffuse reflection image acquisition unit 32 acquires a diffuse reflection image, and the process proceeds to step S102.

In step S102, the specular reflection image acquisition unit 34 acquires a specular reflection image, and the process proceeds to step S104.

In step S104, the RGB→L* C* H* conversion unit 36 converts each of the diffuse reflection image and the specular reflection image from the RGB image into image data of the color components of L* C* H*, and the process proceeds to step S106.

In step S106, the saturation difference image acquisition unit 38 acquires a saturation difference image between the diffuse reflection image and the specular reflection image, and the process proceeds to step S108. Here, a description will be given as an example of acquiring a saturation difference image obtained by subtracting a diffuse reflection image from a specular reflection image.

In step S108, the metal gloss level determination unit 40 determines whether or not there is metal gloss. Here, as an example, it is determined whether or not the difference image is positive (greater than 0). In a case where the determination is positive, the process proceeds to step S110, and in a case where the determination is negative, the process proceeds to step S112.

In step S110, the metal gloss level determination unit 40 outputs the presence of metal gloss as a determination result.

On the other hand, in step S112, the metal gloss level determination unit 40 outputs the absence of metal gloss as a determination result.

Thus, by displaying an image according to the presence or absence of metal gloss, and forming an image, by using the determination result of the metal gloss level determination unit 40, in a case where the texture of the object surface has metal gloss, the metal gloss is reproduced, and in a case where there is no metal gloss, the non-metal gloss is reproduced.

Second Exemplary Embodiment

Figure 5:
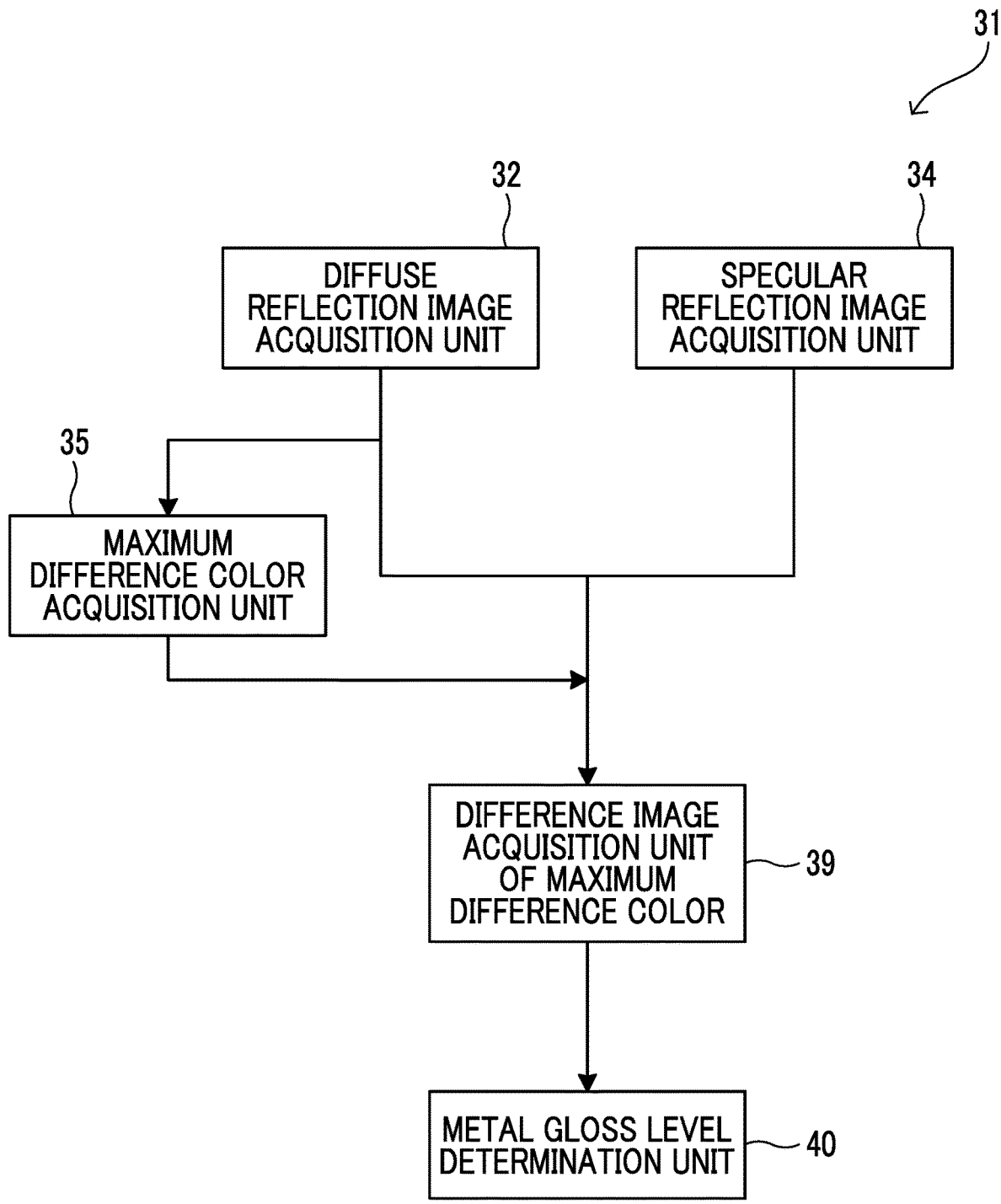
FIG. 5 is a block diagram illustrating a configuration of an image processing apparatus according to a second exemplary embodiment.

Subsequently, an image processing apparatus according to the present exemplary embodiment will be described. FIG. 5 is a block diagram illustrating a configuration of the image processing apparatus according to the present exemplary embodiment. In addition, the identical components to the components in FIG. 2 may be denoted by the identical reference numerals and detailed description thereof may be omitted.

The image processing apparatus 31 according to the present exemplary embodiment has functions of a diffuse reflection image acquisition unit 32, a specular reflection image acquisition unit 34, a maximum difference color acquisition unit 35, a difference image acquisition unit 39 of a maximum difference color, and a metal gloss level determination unit 40. The image processing apparatus 31 includes a computer in which a central processing unit (CPU), a read only memory (ROM), a random access memory (RAM), and the like are connected through a bus so as to communicate with each other. The CPU is a central processing unit, and executes various programs or controls each unit. That is, the CPU reads a program from the ROM, and executes the program using the RAM as a work area. The CPU controls the above-described components and performs various arithmetic processes in accordance with the program stored in the ROM. In the present exemplary embodiment, the ROM stores a program for executing the above-described respective functions. In addition, the maximum difference color acquisition unit 35, the difference image acquisition unit 39 of a maximum difference color, and the metal gloss level determination unit 40 correspond to an output unit.

The diffuse reflection image acquisition unit 32 and the specular reflection image acquisition unit 34 acquire the diffuse reflection image and the specular reflection image obtained by the texture reading device 10, respectively. The diffuse reflection image acquisition unit 32 and the specular reflection image acquisition unit 34 may be connected to the texture reading device 10, respectively, and acquire these images from the texture reading device 10. Alternatively, these images may be acquired through a server or the like connected to the texture reading device 10 through a network.

The maximum difference color acquisition unit 35 extracts, as the maximum difference color, the maximum color having the maximum value and the minimum color having the minimum value from among the RGB colors, in the diffuse reflection image acquired by the diffuse reflection image acquisition unit 32, and outputs notification of the extraction result to the difference image acquisition unit 39 of the maximum difference color.

The difference image acquisition unit 39 of a maximum difference color acquires a difference image for maximum difference color of each of the diffuse reflection image and the specular reflection image, based on the acquisition result of the maximum difference color acquisition unit 35. Since the saturation is determined by a value (difference) obtained by subtracting the minimum color value from the maximum color value of RGB, the difference image of the maximum difference color of each of the diffuse reflection image and the specular reflection image is equivalent to a saturation difference image in the first exemplary embodiment.

The metal gloss level determination unit 40 determines the metal gloss level. In the present exemplary embodiment, the metal gloss level determination unit 40 determines the metal gloss level using the difference image of a maximum difference color acquired by the difference image acquisition unit 39 of a maximum difference color, and outputs the determination result. For example, the difference between the maximum difference colors (for example, the R value-G value in FIG. 6) is output as information representing the metal gloss level.

Figure 6:
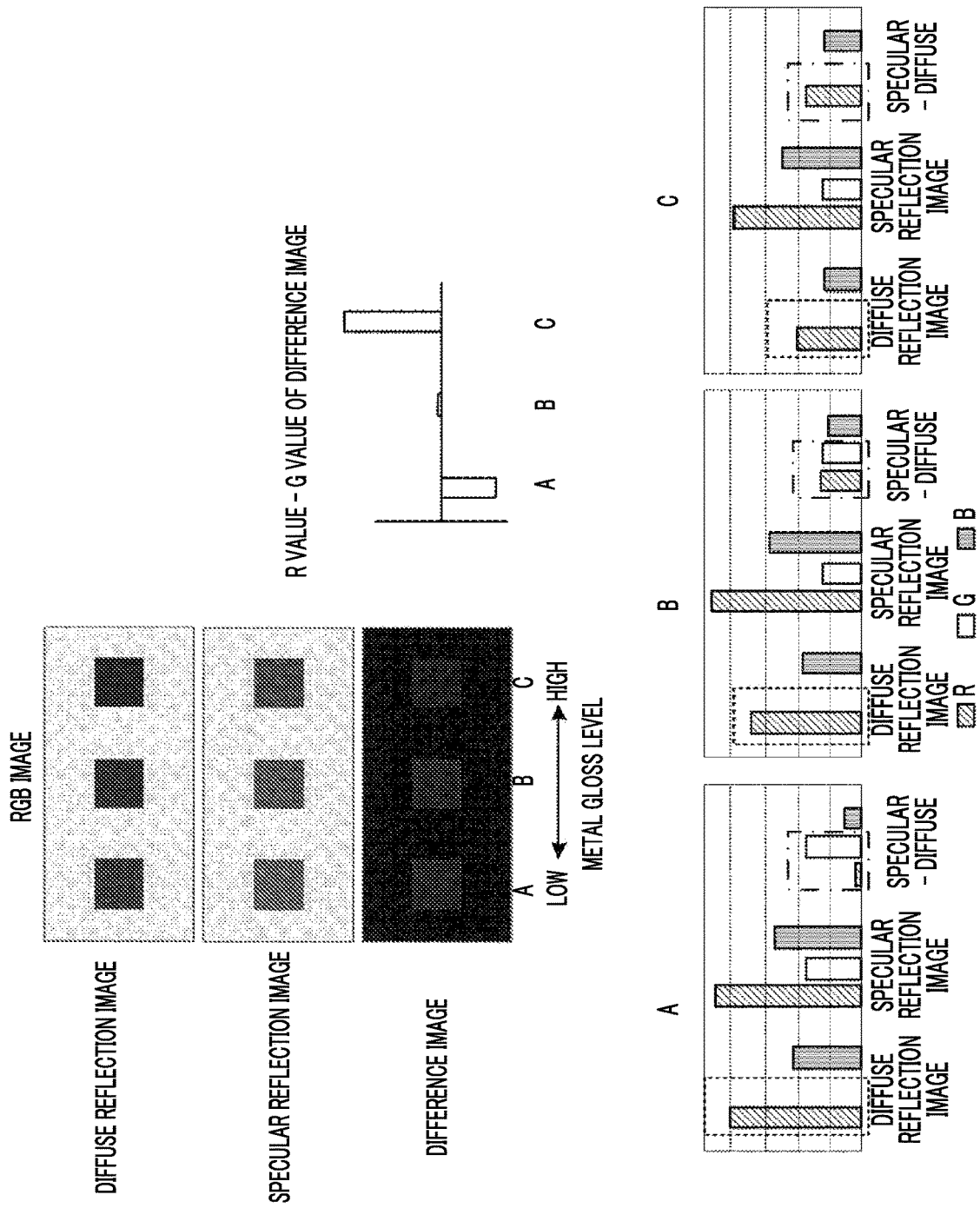
FIG. 6 is a diagram for explaining an example of determination of a metal gloss level by the metal gloss level determination unit according to the second exemplary embodiment.

FIG. 6 is a diagram for explaining an example of determination of a metal gloss level by the metal gloss level determination unit 40 according to the present exemplary embodiment.

In FIG. 6, as in FIG. 3, three types A to C as metal gloss levels are compared and shown. Note that the diffuse reflection images and specular reflection images of A to C are magenta color images.

In the example of FIG. 6, the maximum difference color acquisition unit 35 acquires the R color as the maximum color, and the G color as the minimum color, from the RGB image of the diffuse reflection image, as being surrounded by dotted lines.

The difference image acquisition unit 39 of a maximum difference color acquires a difference image between the diffuse reflection image and the specular reflection image, for the R color and the G color as the maximum difference colors, as being surrounded by one-dot chain lines. The example of FIG. 6 shows an example obtained by subtracting the diffuse reflection image from the specular reflection image for the maximum difference color.

Then, the metal gloss level determination unit 40 subtracts the G color from the R color of the difference image corresponding to the saturation, and outputs the difference as information representing the metal gloss level as in the first exemplary embodiment.

Figure 7:
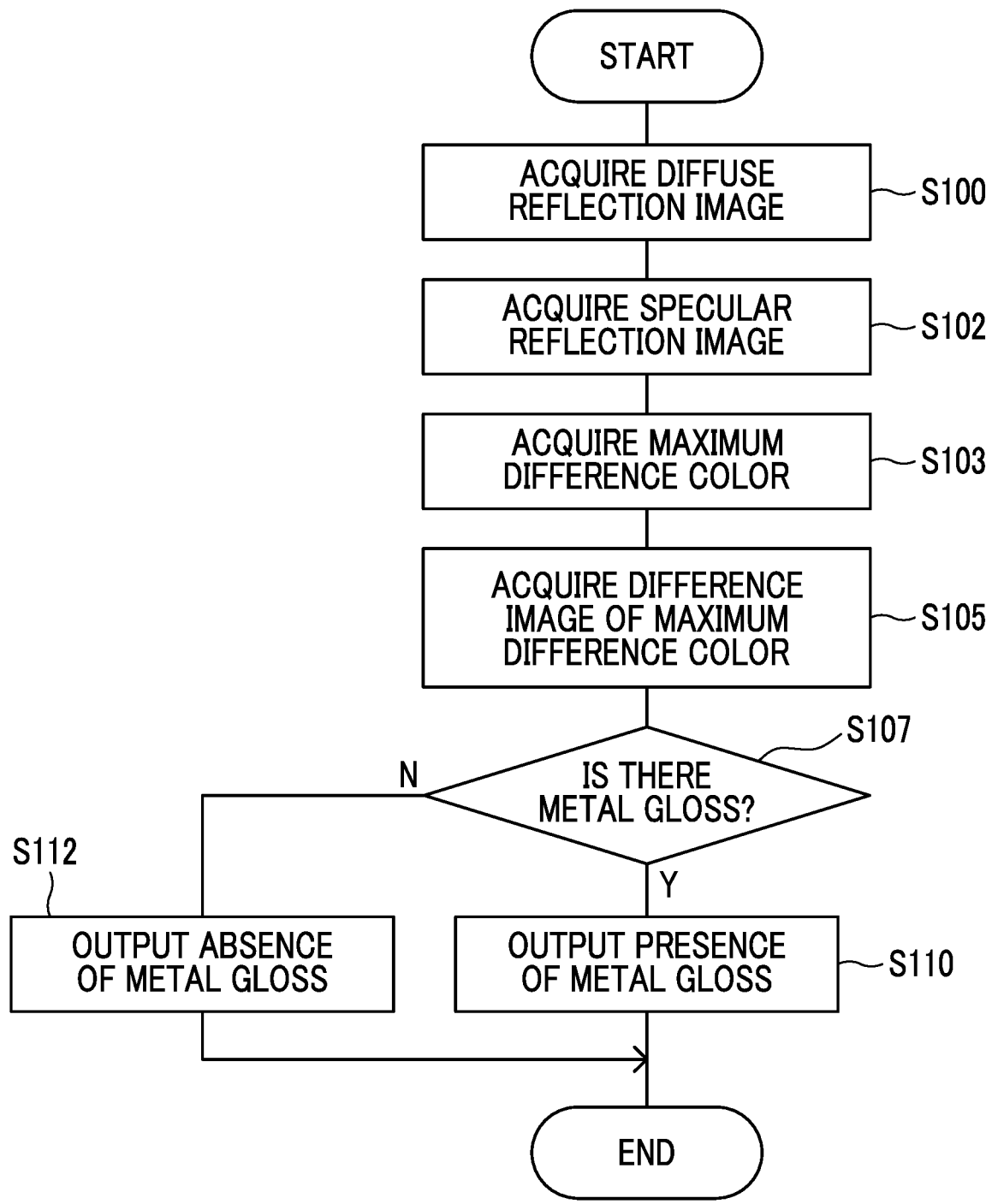
FIG. 7 is a flowchart illustrating an example of a flow of a process performed by the image processing apparatus according to the second exemplary embodiment.

Next, specific processing performed by the image processing apparatus 31 according to the present exemplary embodiment configured as described above will be described. FIG. 7 is a flowchart illustrating an example of a flow of a process performed by the image processing apparatus 31 according to the present exemplary embodiment. The identical processes to the processes in the first exemplary embodiment will be described with the identical reference numerals.

In step S100, the diffuse reflection image acquisition unit 32 acquires a diffuse reflection image, and the process proceeds to step S102.

In step S102, the specular reflection image acquisition unit 34 acquires a specular reflection image, and the process proceeds to step S103.

In step S103, the maximum difference color acquisition unit 35 acquires the maximum color and the minimum color among the RGB colors as the maximum difference color, from the diffuse reflection image acquired by the diffuse reflection image acquisition unit 32, and the process proceeds to step S105.

In step S105, the difference image acquisition unit 39 of the maximum difference color acquires a difference image for the maximum difference color acquired by the difference image acquisition unit 39 of the maximum difference color of each of the diffuse reflection image and the specular reflection image, and the process proceeds to step S107. Here, an example will be described in which a difference image obtained by subtracting a diffuse reflection image from a specular reflection image for the maximum difference color is acquired.

In step S107, the metal gloss level determination unit 40 determines whether or not there is metal gloss. For example, in this determination, since the difference image of the maximum difference color corresponds to the saturation, it is determined whether or not there is metal gloss by the identical method to the method in the first exemplary embodiment. In a case where the determination is positive, the process proceeds to step S110, and in a case where the determination is negative, the process proceeds to step S112.

In step S110, the metal gloss level determination unit 40 outputs the presence of metal gloss as a determination result.

On the other hand, in step S112, the metal gloss level determination unit 40 outputs the absence of metal gloss as a determination result.

Thus, by displaying an image according to the presence or absence of metal gloss, and forming an image, by using the determination result of the metal gloss level determination unit 40, in a case where the texture of the object surface has metal gloss, the metal gloss is reproduced, and in a case where there is no metal gloss, the non-metal gloss is reproduced.

Third Exemplary Embodiment

Figure 8:
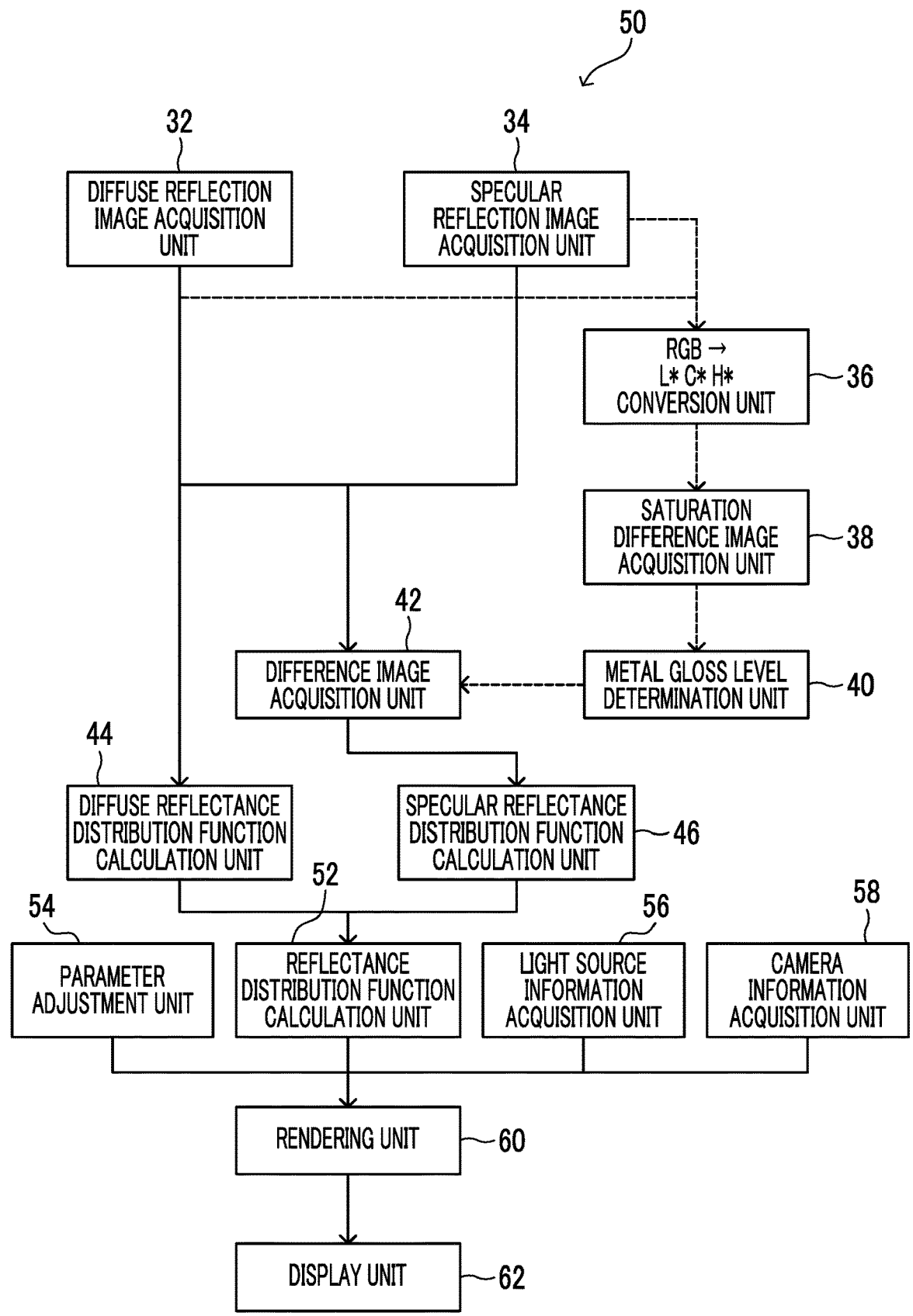
FIG. 8 is a block diagram illustrating a configuration of a display device according to a third exemplary embodiment.

Subsequently, a display device according to the present exemplary embodiment will be described. FIG. 8 is a block diagram illustrating a configuration of a display device according to the present exemplary embodiment. Note that, since a display device 50 according to the present exemplary embodiment includes the image processing apparatus 30 according to the first exemplary embodiment, the identical components to the components in FIG. 2 may be denoted by the identical reference numerals and detailed description thereof may be omitted.

The display device 50 according to the present exemplary embodiment includes the image processing apparatus 30 according to the first exemplary embodiment. That is, the display device 50 has functions of a diffuse reflection image acquisition unit 32, a specular reflection image acquisition unit 34, an RGB→L* C* H* conversion unit 36, a saturation difference image acquisition unit 38, and a metal gloss level determination unit 40.

In addition, the display device 50 has functions of a difference image acquisition unit 42 as an image acquisition unit, a diffuse reflectance distribution function calculation unit 44, a specular reflectance distribution function calculation unit 46, a reflectance distribution function calculation unit 52, a parameter adjustment unit 54, a light source information acquisition unit 56, a camera information acquisition unit 58, a rendering unit 60, and a display unit 62. The rendering unit 60 and the display unit 62 correspond to a reproduction unit.

In a case where the metal gloss level determination unit 40 determines that there is metal gloss, the difference image acquisition unit 42 acquires the difference image by calculating the difference between the diffuse reflection image and the specular reflection image in the RGB image having color components. In a case where the metal gloss level determination unit 40 determines that there is no metal gloss, the difference image acquisition unit 42 acquires the difference image by converting the RGB image of each of the diffuse reflection image and the specular reflection image into a gray scale, and calculating a difference between the diffuse reflection image and the specular reflection image in the gray scale having no color component. For example, conversion from RGB to gray scale is performed by the following Expression (1).

$$\text{Gray Scale} = ((0.298912 * R) + (0.586611 * G) + (0.114478 * B)) \quad (1)$$

Note that there are two difference images: (specular reflection image-diffuse reflection image) and (diffuse reflection image-specular reflection image), and the difference image acquisition unit 42 calculates at least one of these difference images.

The diffuse reflectance distribution function calculation unit 44 calculates the diffuse reflectance distribution function of the object 12 by using the diffuse reflection image. For example, the diffuse reflectance distribution function calculation unit 44 calculates the diffuse reflectance $\rho d$ as a parameter from the diffuse reflection image, with $\rho d$ as the diffuse reflectance for incident light, $\theta i$ as the incident angle, and the diffuse reflectance distribution function as $\rho d \cdot \cos \theta i$, according to the Lambert reflection model.

The specular reflectance distribution function calculation unit 46 calculates the specular reflectance distribution function of the object 12 using the RGB difference image in a case where there is metal gloss, and calculates the specular reflectance distribution function of the object 12 using the gray scale difference image in a case where there is no metal gloss. For example, the specular reflectance distribution function calculation unit 46 calculates the specular reflectance $\rho s$, n as parameters from the difference image, with $\rho s$ as a specular reflectance, $\gamma$ as the angle formed by the direction of specular reflection and the line-of-sight direction, n as the specular reflection index, and $\rho s \cdot \cos n\gamma$ as the specular reflectance distribution function, according to the Phong reflection model. In addition, two difference images are acquired by the difference image acquisition unit 42. In a case where these two difference images are used to calculate a specular reflectance distribution function, the specular reflectance distribution function calculation unit defines a specular reflectance distribution function as $\rho s1 \cdot \cos n1\gamma$ for the difference image (specular reflection image-diffuse reflection image), and defines a specular reflectance distribution function as $\rho s2 \cdot \cos n2\gamma$ for the difference image (diffuse reflection image-specular reflection image), and calculates $\rho s1$, $\rho s2$, n1, and n2 as parameters, from the respective difference images.

The reflectance distribution function calculation unit 52 calculates the reflectance distribution function for each pixel of the object 12 by using the diffuse reflectance distribution function calculated by the diffuse reflectance distribution function calculation unit 44 and the specular reflectance distribution function calculated by the specular reflectance distribution function calculation unit 46. For example, the reflectance distribution function calculation unit 52 calculates the reflectance distribution function by using "the reflectance distribution function=the diffuse reflectance distribution function+the specular reflectance distribution function", according to Lambert's reflection model and Phong's reflection model.

The parameter adjustment unit 54 sets various parameters, the light source information acquisition unit 56 acquires light source information such as the light source direction, and the camera information acquisition unit 58 acquires camera information such as the line-of-sight direction. For example, the parameter adjustment unit 54 sets parameters of the reflection model used when the specular reflectance distribution function calculation unit 46 calculates the specular reflectance from the difference image and the specular reflection weight coefficient. Specifically, the parameter adjustment unit 54 sets each of parameters such as the diffuse reflection weight coefficient wd, the specular reflection weight coefficient ws, and the specular reflection index n to a predetermined fixed value, used in the reflection model, according to the reflection characteristics of the target object and the output characteristics of the display device.

The rendering unit 60 renders a three-dimensional model on a virtual screen set in a virtual three-dimensional space, based on the reflectance distribution function calculated by the reflectance distribution function calculation unit 52, the various parameters set by the parameter adjustment unit 54, the light source information (light source direction) acquired by the light source information acquisition unit 56, and the camera information (line-of-sight direction) acquired by camera information acquisition unit 58. Note that the rendering process is known, and for example, the rendering process may be performed using a radiosity method or a ray tracing method considering mutual reflection.

The display unit 62 reproduces and displays the texture of the object 12 as CG by using image data obtained by the rendering process. By reproducing and displaying the texture of the object 12 in this way, the object surface is reproduced and displayed such that the color of the illumination is darker as the saturation of the diffuse reflection image is higher than of the specular reflection image. Note that the second exemplary embodiment may be used to make a determination by the metal gloss level determination unit 40 to reproduce and display the texture of the object 12 as CG. In this case, the object surface is reproduced and displayed such that the color of the illumination is darker as the value representing the saturation of the diffuse reflection image is higher than of the specular reflection image.

Figure 9:
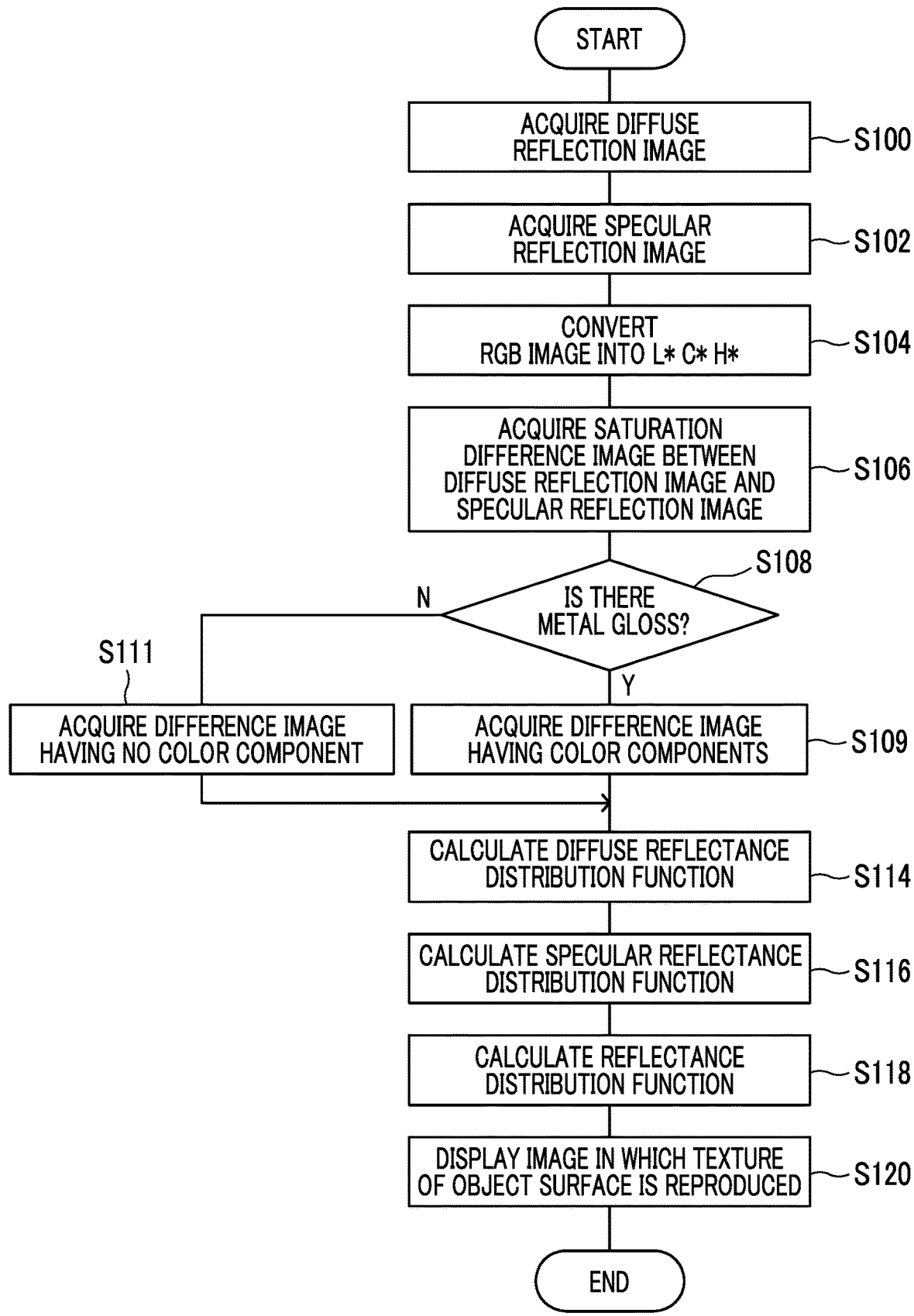
FIG. 9 is a flowchart illustrating an example of a flow of a process performed by the display device according to the third exemplary embodiment.

Next, specific processing performed by the display device 50 according to the present exemplary embodiment configured as described above will be described. FIG. 9 is a flowchart illustrating an example of a flow of a process performed by the display device 50 according to the present exemplary embodiment. The identical processes to the processes performed in the image processing apparatus 30 according to the first exemplary embodiment will be described with the identical reference numerals.

In step S100, the diffuse reflection image acquisition unit 32 acquires a diffuse reflection image, and the process proceeds to step S102.

In step S102, the specular reflection image acquisition unit 34 acquires a specular reflection image, and the process proceeds to step S104.

In step S104, the RGB→L* C* H* conversion unit 36 converts each of the diffuse reflection image and the specular reflection image from the RGB image into image data of the color components of L* C* H*, and the process proceeds to step S106.

In step S106, the saturation difference image acquisition unit 38 acquires a saturation difference image between the diffuse reflection image and the specular reflection image, and the process proceeds to step S108. Here, a description will be given as an example of acquiring a saturation difference image obtained by subtracting a diffuse reflection image from a specular reflection image.

In step S108, the metal gloss level determination unit 40 determines whether or not there is metal gloss. Here, as an example, it is determined whether or not the difference image is positive (greater than 0). In a case where the determination is positive, the process proceeds to step S109, and in a case where the determination is negative, the process proceeds to step S111.

In step S109, the difference image acquisition unit 42 acquires a difference image having color components and the process proceeds to step S114. That is, a difference image is acquired by calculating a difference between a diffuse reflection image and a specular reflection image in an RGB image having color components.

On the other hand, in step S111, the difference image acquisition unit 42 acquires a difference image having no color component and the process proceeds to step S114. That is, the difference image acquisition unit 42 acquires the difference image by converting the RGB image of each of the diffuse reflection image and the specular reflection image into a gray scale, and calculating a difference between the diffuse reflection image and the specular reflection image in the gray scale having no color component.

In step S114, the diffuse reflectance distribution function calculation unit 44 calculates the diffuse reflectance distribution function of the object 12 by using the diffuse reflection image, and the process proceeds to step S116. Specifically, the diffuse reflectance is calculated from the diffuse reflection image and the diffuse reflection weight coefficient. Note that the parameter adjustment unit 54 sets a fixed value for the diffusion weight coefficient in advance according to the reflection characteristics of the target object and display device output characteristics.

In step S116, the specular reflectance distribution function calculation unit 46 calculates the specular reflectance distribution function of the object 12 by using the difference image acquired by the difference image acquisition unit 42, and the process proceeds to step S118. Specifically, the specular reflectance is calculated from the difference image and the specular reflection weight coefficient. Note that the parameter adjustment unit 54 sets a fixed value for the specular reflection weight coefficient in advance according to the reflection characteristics of the target object and display device output characteristics. Further, in the present exemplary embodiment, in a case of calculating the specular reflectance distribution function, the specular reflectance distribution function of the object 12 is calculated using the RGB difference image when the metal gloss is present, and in a case where the metal gloss is absent, the specular reflectance distribution function of the object is calculated using the gray scale difference image.

In step S118, the reflectance distribution function calculation unit 52 calculates the reflectance distribution function for each pixel of the object 12 by using the diffuse reflectance distribution function calculated in step S114 and the specular reflectance distribution function calculated in step S116, and the process proceeds to step S120. Specifically, the reflectance distribution function calculation unit 52 calculates the reflection light intensity I(x, y) on the two-dimensional plane as a reflectance distribution function, by using the diffuse reflectance distribution function obtained by the diffuse reflectance distribution function calculation unit 44 and the specular reflectance distribution function obtained by the specular reflectance distribution function calculation unit 46, according to Lambert's reflection model and Phong's reflection model, by using $$I(x,y)=I_i\cdot\{w_d\cdot G_d(x,y)\cdot\cos\theta_i\}+I_i\cdot\{w_s\cdot\{G_s(x,y)-G_d(x,y)\}\cdot\cos^n\gamma\}$$ [Expression 1]

Here, {wd·Gd(x, y)·cos θi}: diffuse reflectance distribution function
wd: diffuse reflection weight coefficient
Gd(x, y): diffuse reflection image
{ws·{Gs (x, y)−Gd(x, y)}·cos nγ}: specular reflectance distribution function
ws: specular reflection weight coefficient
Gs(x, y): specular reflection image
n: specular reflection index.

Note that the parameter adjustment unit 54 sets a fixed value for the specular reflection index in advance according to the reflection characteristics of the target object and display device output characteristics. Further, the difference image is (specular reflection image-diffuse reflection image), and the number of pixels having a negative difference value is 0. The reflection light intensity I(x, y) is calculated separately for each of the R, G, and B components of the diffuse reflection image and the specular reflection image. Thereby, the reflected color of the object 12 is calculated.

In step S120, the display unit 62 displays an image in which the texture of the object surface is reproduced, and the series of processes end. That is, the rendering unit 60 renders a three-dimensional model on a virtual screen set in a virtual three-dimensional space, based on the reflectance distribution function calculated in step S116, the various parameters set by the parameter adjustment unit 54, the light source information (light source direction) acquired by the light source information acquisition unit 56, and the camera information (line-of-sight direction) acquired by camera information acquisition unit 58. Then, the display unit 62 reproduces and displays the texture of the object 12 as CG by using image data obtained by the rendering process.

As described above, in the present exemplary embodiment, the diffuse reflectance distribution function is calculated from the diffuse reflection image, and the specular reflectance distribution function is calculated from the difference image. Here, with respect to the difference image, only the glossy part of the object is accurately extracted, so the specular reflectance distribution function for each pixel on the two-dimensional plane is calculated with high accuracy. Thereby, the texture of the object surface is displayed by a simple calculation using a small amount of image data without acquiring a bidirectional reflectance distribution function (BRDF). In addition, since the presence or absence of metal gloss is determined from the saturation difference image, and the image is displayed by calculating the reflectance distribution function corresponding to the presence or absence of metal gloss, in a case where the texture of the object surface has metal gloss, the metal gloss is reproduced, and in a case where there is no metal gloss, the non-metal gloss is reproduced.

Fourth Exemplary Embodiment

Figure 10:
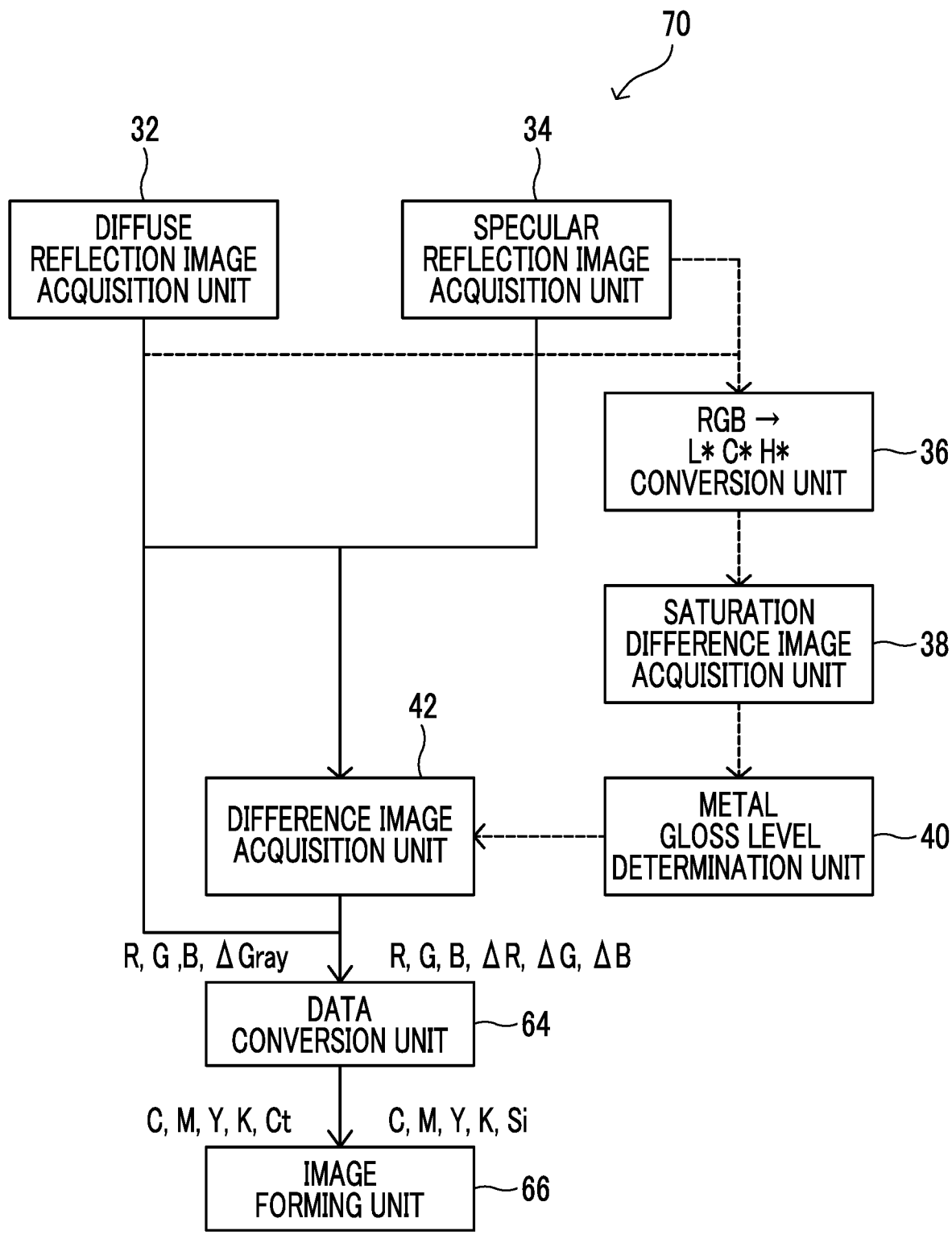
FIG. 10 is a block diagram illustrating a configuration of an image forming apparatus according to a fourth exemplary embodiment.

Subsequently, an image forming apparatus according to the present exemplary embodiment will be described. FIG. 10 is a block diagram illustrating a configuration of the image forming apparatus according to the present exemplary embodiment. Note that, since an image forming apparatus 70 according to the present exemplary embodiment includes the image processing apparatus 30 according to the first exemplary embodiment, the identical components to the components in FIGS. 2 and 8 may be denoted by the identical reference numerals and detailed description thereof may be omitted.

The image forming apparatus 70 according to the present exemplary embodiment includes the image processing apparatus 30 according to the first exemplary embodiment, and also has functions of a diffuse reflection image acquisition unit 32, a specular reflection image acquisition unit 34, an RGB→L* C* H* conversion unit 36, a saturation difference image acquisition unit 38, and a metal gloss level determination unit 40.

Further, the image forming apparatus 70 has functions of a difference image acquisition unit 42 as an image acquisition unit, a data conversion unit 64 as a conversion unit, and an image forming unit 66. The data conversion unit 64 and the image forming unit 66 correspond to a reproduction unit.

Similar to the third exemplary embodiment, in a case where the metal gloss level determination unit 40 determines that there is metal gloss, the difference image acquisition unit 42 acquires the difference image by calculating the difference between the diffuse reflection image and the specular reflection image in the RGB image having the color components. In a case where the metal gloss level determination unit 40 determines that there is no metal gloss, the difference image acquisition unit 42 acquires the difference image by converting the RGB image of each of the diffuse reflection image and the specular reflection image into a gray scale, and calculating a difference between the diffuse reflection image and the specular reflection image in the gray scale having no color component. Note that there are two difference images: (specular reflection image-diffuse reflection image) and (diffuse reflection image-specular reflection image), and the difference image acquisition unit 42 calculates at least one of these difference images.

In a case where the metal gloss level determination unit 40 determines that there is metal gloss, the data conversion unit 64 performs conversion from the diffuse reflection image (R, G, B) and the RGB difference image (ΔR, ΔG, ΔB) with color components into recording material data including metal components (for example, cyan (C), magenta (M), yellow (Y), black (K), and silver recording material (Si)). Further, in a case where the metal gloss level determination unit 40 determines that there is no metal gloss, conversion from the diffuse reflection image (R, G, B) and the gray scale difference image (ΔGray) without color components into recording material data including no metal components (for example, C, M, Y, K, Ct (clear recording material)) is performed. The data conversion unit 64 performs data conversion using the glossy texture reproduction profile. The glossy texture reproduction profile is generated by obtaining the correspondence between (C, M, Y, K, Si) color space of recording material data and (R, G, B, ΔR, ΔG, ΔB) or (R, G, B, ΔGray) color space of texture information. As an example, the correspondence is generated using the technique described in Japanese Patent Application No. 2018-189223 proposed in the present application. The silver recording material may be replaced with a metallic film or metallic paper instead of metallic ink or metallic toner. Further, RGB may be converted into L* a* b*, and ΔGray may be converted into Gloss.

The image forming unit 66 forms an image on a recording medium, using the recording material data converted by the data conversion unit 64. By forming an image that reproduces the texture of the object 12 in this way, an image is formed in which the texture of the object surface is reproduced such that the color of the illumination is darker as the saturation of the diffuse reflection image is higher than of the specular reflection image. Note that an image in which the texture of the object 12 is reproduced may be formed by the metal gloss level determination unit 40 performing the determination by using the second exemplary embodiment. In this case, an image is formed in which the object surface is reproduced such that the color of the illumination is darker as the value representing the saturation of the diffuse reflection image is higher than of the specular reflection image.

Figure 11:
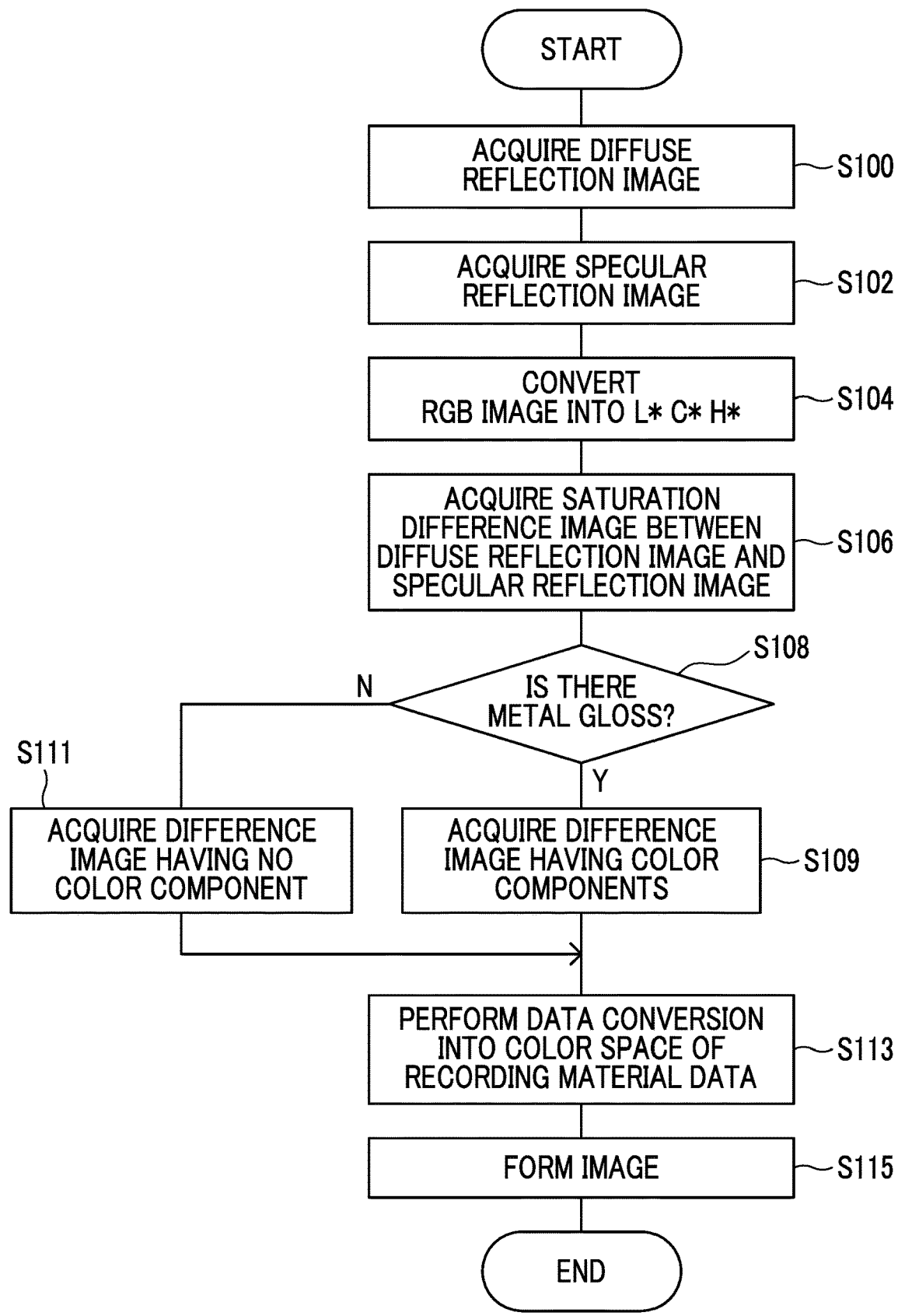
FIG. 11 is a flowchart illustrating an example of a flow of a process performed by the image forming apparatus according to the fourth exemplary embodiment.

Next, specific processing performed by the image forming apparatus 70 according to the present exemplary embodiment configured as described above will be described. FIG. 11 is a flowchart illustrating an example of a flow of a process performed by the image forming apparatus 70 according to the present exemplary embodiment. The identical processes to the processes performed in the image processing apparatus 30 according to the first exemplary embodiment will be described with the identical reference numerals.

In step S100, the diffuse reflection image acquisition unit 32 acquires a diffuse reflection image, and the process proceeds to step S102.

In step S102, the specular reflection image acquisition unit 34 acquires a specular reflection image, and the process proceeds to step S104.

In step S104, the RGB→L* C* H* conversion unit 36 converts each of the diffuse reflection image and the specular reflection image from the RGB image into image data of the color components of L* C* H*, and the process proceeds to step S106.

In step S106, the saturation difference image acquisition unit 38 acquires a saturation difference image between the diffuse reflection image and the specular reflection image, and the process proceeds to step S108. Here, a description will be given as an example of acquiring a saturation difference image obtained by subtracting a diffuse reflection image from a specular reflection image.

In step S108, the metal gloss level determination unit 40 determines whether or not there is metal gloss. Here, as an example, it is determined whether or not the difference image is positive (greater than 0). In a case where the determination is positive, the process proceeds to step S109, and in a case where the determination is negative, the process proceeds to step S111.

In step S109, the difference image acquisition unit 42 acquires a difference image having color components and the process proceeds to step S113. That is, a difference image is acquired by calculating a difference between a diffuse reflection image and a specular reflection image in an RGB image having color components.

On the other hand, in step S111, the difference image acquisition unit 42 acquires a difference image having no color component and the process proceeds to step S113. That is, the difference image acquisition unit 42 acquires the difference image by converting the RGB image of each of the diffuse reflection image and the specular reflection image into a gray scale, and calculating a difference between the diffuse reflection image and the specular reflection image in the gray scale having no color component.

In step S113, the data conversion unit 64 performs data conversion from the RGB color space into the color space of the recording material data, and the process proceeds to step S115. That is, in a case where a difference image having color components is acquired in step S109, (R, G, B, ΔR, ΔG, ΔB) is converted into (C, M, Y, K, Si). In a case where a difference image having no color component is acquired in step S111, (R, G, B, ΔGray) is converted into (C, M, Y, K, Ct).

In step S115, the image forming unit 66 forms an image on a recording medium such as paper using the converted recording material data, and the series of processing ends.

By performing the processing in this way, in the present exemplary embodiment, as in the above exemplary embodiments, the texture of the object surface is displayed by a simple calculation using a small amount of image data without acquiring a bidirectional reflectance distribution function (BRDF). In addition, since the presence or absence of metal gloss is determined from the saturation difference image, and the image is formed by performing conversion into recording material data using the difference image corresponding to the presence or absence of metal gloss, in a case where the texture of the object surface has metal gloss, the metal gloss is reproduced, and in a case where there is no metal gloss, the non-metal gloss is reproduced.

In addition, the processes performed by the image processing apparatus 30, 31, the display device 50, and the image forming apparatus 70 according to the above exemplary embodiments may be processes performed by software, processes performed by hardware, or a combination of both. In addition, the processes performed by the image processing apparatus 30, 31, the display device 50, and the image forming apparatus 70 may be stored as a program in a storage medium and be distributed.

In addition, the present invention is not limited to the above, and it goes without saying that various modifications can be made without departing from the scope of the invention, in addition to the above.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image processing apparatus comprising:
a processor configured to:
acquire a diffuse reflection image of an object surface and a specular reflection image of the object surface; and
reproduce the object surface such that illumination color is darker as saturation of the diffuse reflection image or a value representing the saturation is higher than of the specular reflection image, by using the diffuse reflection image and the specular reflection image.

2. An image processing apparatus comprising:
a processor configured to:
acquire a diffuse reflection image of an object surface and a specular reflection image of the object surface; and
output object surface information representing that a metal gloss level of the object surface is higher as saturation of the specular reflection image or a value representing the saturation is higher than of the diffuse reflection image, by using the diffuse reflection image and the specular reflection image.

3. The image processing apparatus according to claim 2, wherein the processor outputs a difference image between saturation of the diffuse reflection image and the saturation of the specular reflection image as the object surface information.

4. The image processing apparatus according to claim 2, wherein the processor extracts maximum color and minimum color from the acquired diffuse reflection image, and outputs a difference image between the diffuse reflection image and the specular reflection image of each of the extracted maximum color and minimum color as the object surface information.

5. The image processing apparatus according to claim 2, wherein the processor is further configured to
select presence or absence of color components using the output object surface information, and acquire a difference image between the diffuse reflection image and the specular reflection image, corresponding to the selected presence or absence of color components;
calculate a reflectance distribution function of the object surface, using the acquired diffuse reflection image and the acquired difference image; and
wherein the image processing apparatus further comprises a display unit that displays reflection color of the object surface corresponding to a change in an orientation of the object surface, using the calculated reflectance distribution function.

6. The image processing apparatus according to claim 3, wherein the processor is further configured to
select presence or absence of color components using the output object surface information, and acquire a difference image between the diffuse reflection image and the specular reflection image, corresponding to the selected presence or absence of color components;
calculate a reflectance distribution function of the object surface, using the acquired diffuse reflection image and the acquired difference image; and
wherein the image processing apparatus further comprises a display unit that displays reflection color of the object surface corresponding to a change in an orientation of the object surface, using the calculated reflectance distribution function.

7. The image processing apparatus according to claim 4, wherein the processor is further configured to
select presence or absence of color components using the output object surface information, and acquire a difference image between the diffuse reflection image and the specular reflection image, corresponding to the selected presence or absence of color components;
calculate a reflectance distribution function of the object surface, using the acquired diffuse reflection image and the acquired difference image; and
wherein the image processing apparatus further comprises a display unit that displays reflection color of the object surface corresponding to a change in an orientation of the object surface, using the calculated reflectance distribution function.

8. The image processing apparatus according to claim 5, wherein the processor acquires a difference image with color components in a case where the metal gloss level is higher than a predetermined metal gloss level, and acquires a difference image without color components in a case where the metal gloss level is equal to or less than the predetermined metal gloss level.

9. The image processing apparatus according to claim 6, wherein the processor acquires a difference image with color components in a case where the metal gloss level is higher than a predetermined metal gloss level, and acquires a difference image without color components in a case where the metal gloss level is equal to or less than the predetermined metal gloss level.

10. The image processing apparatus according to claim 7, wherein the processor acquires a difference image with color components in a case where the metal gloss level is higher than a predetermined metal gloss level, and acquires a difference image without color components in a case where the metal gloss level is equal to or less than the predetermined metal gloss level.

11. The image processing apparatus according to claim 2, wherein the processor is further configured to
select presence or absence of color components using the output object surface information, and acquire a difference image between the diffuse reflection image and the specular reflection image, corresponding to the selected presence or absence of color components; and
convert the acquired diffuse reflection image and the acquired difference image into recording material data.

12. The image processing apparatus according to claim 3, wherein the processor is further configured to
select presence or absence of color components using the output object surface information, and acquire a difference image between the diffuse reflection image and the specular reflection image, corresponding to the selected presence or absence of color components; and
convert the acquired diffuse reflection image and the acquired difference image into recording material data.

13. The image processing apparatus according to claim 4, wherein the processor is further configured to
select presence or absence of color components using the output object surface information, and acquire a difference image between the diffuse reflection image and the specular reflection image, corresponding to the selected presence or absence of color components; and
convert the acquired diffuse reflection image and the acquired difference image into recording material data.

14. The image processing apparatus according to claim 11,
wherein the processor acquires a difference image with color components in a case where the metal gloss level is higher than a predetermined metal gloss level, and acquires a difference image without color components in a case where the metal gloss level is equal to or less than the predetermined metal gloss level, and
wherein the processor performs conversion from the acquired diffuse reflection image and the acquired difference image with color components into recording material data including metal components in a case where the metal gloss level is higher than the predetermined metal gloss level, and performs conversion from the acquired diffuse reflection image and the acquired difference image without color components into recording material data including no metal components in a case where the metal gloss level is equal to or less than the predetermined metal gloss level.

15. The image processing apparatus according to claim 12,
wherein the processor acquires a difference image with color components in a case where the metal gloss level is higher than a predetermined metal gloss level, and acquires a difference image without color components in a case where the metal gloss level is equal to or less than the predetermined metal gloss level, and
wherein the processor performs conversion from the acquired diffuse reflection image and the acquired difference image with color components into recording material data including metal components in a case where the metal gloss level is higher than the predetermined metal gloss level, and performs conversion from the acquired diffuse reflection image and the acquired difference image without color components into recording material data including no metal components in a case where the metal gloss level is equal to or less than the predetermined metal gloss level.

16. The image processing apparatus according to claim 13,
wherein the processor acquires a difference image with color components in a case where the metal gloss level is higher than a predetermined metal gloss level, and acquires a difference image without color components in a case where the metal gloss level is equal to or less than the predetermined metal gloss level, and
wherein the processor performs conversion from the acquired diffuse reflection image and the acquired difference image with color components into recording material data including metal components in a case where the metal gloss level is higher than the predetermined metal gloss level, and performs conversion from the acquired diffuse reflection image and the acquired difference image without color components into recording material data including no metal components in a case where the metal gloss level is equal to or less than the predetermined metal gloss level.

17. A non-transitory computer readable medium storing an image processing program causing a computer to function as the image processing apparatus according to claim 1.

18. A non-transitory computer readable medium storing an image processing program causing a computer to function as the image processing apparatus according to claim 2.

19. A non-transitory computer readable medium storing an image processing program causing a computer to function as the image processing apparatus according to claim 3.

20. A non-transitory computer readable medium storing an image processing program causing a computer to function as the image processing apparatus according to claim 4.

* * * * *